(12) United States Patent
Qiu et al.

(10) Patent No.: US 11,175,383 B2
(45) Date of Patent: *Nov. 16, 2021

(54) CALIBRATION DEVICE OF AUTOMOBILE ASSISTANCE SYSTEM

(71) Applicant: AUTEL INTELLIGENT TECHNOLOGY CORP., LTD., Guangdong (CN)

(72) Inventors: Longxue Qiu, Guangdong (CN); Yong Chen, Guangdong (CN); Jin Chen, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,900

(22) Filed: Apr. 20, 2020

(65) Prior Publication Data
US 2020/0363504 A1 Nov. 19, 2020

Related U.S. Application Data

(63) Continuation-in-part of application No. PCT/CN2018/110099, filed on Oct. 12, 2018.

(30) Foreign Application Priority Data

Oct. 20, 2017 (CN) .......................... 201710985445.3

(51) Int. Cl.
G01S 7/40 (2006.01)
G01S 7/497 (2006.01)
G01S 13/931 (2020.01)

(52) U.S. Cl.
CPC .......... G01S 7/4052 (2013.01); G01S 7/4008 (2013.01); G01S 7/4021 (2013.01); G01S 7/4026 (2013.01);
(Continued)

(58) Field of Classification Search
CPC .... G01S 7/4026; G01S 7/4972; G01S 7/4008; G01S 7/4021; G01S 7/4056;
(Continued)

(56) References Cited

U.S. PATENT DOCUMENTS 4,134,680 A 1/1979 Hunter et al.
D411,473 S * 6/1999 Hampf .......................... D10/65
(Continued)

FOREIGN PATENT DOCUMENTS

CN 101320061 A 12/2008
CN 102590796 A 7/2012
(Continued)

OTHER PUBLICATIONS

Xingyun Yang; "The Design of Correcting Device for Automotive Active Cruise Radar and Lane Keeping System", Machine Design and Manufacturing Engineering; vol. 43, No. 4, Apr. 2014; 4 pages; Abstract on Last Page.
(Continued)

Primary Examiner — Olumide Ajibade Akonai

(57) ABSTRACT

The present invention relates to the technical field of automobile maintenance and device calibration, and discloses a calibration device of an automobile assistance system, the radar calibration device including a support assembly, a beam assembly, and a sliding member. The beam assembly is mounted to the support assembly and may move relative to the support assembly along a vertical direction. The sliding member is mounted to the beam assembly and may move relative to the beam assembly along a horizontal direction. The calibration device of the automobile assistance system may cause a simulator to be mounted on the sliding member that may slide horizontally from left to right, so that the simulator can slide continuously from left to right, radar for blind areas at a left rear and a right rear of
(Continued)

the automobile are conveniently and rapidly calibrated, and consistency of parameters such as a height and an angle of the calibration device of an automobile assistance system can be ensured, achieving a convenient and more accurate calibration operation.

25 Claims, 2 Drawing Sheets

(52) U.S. Cl.
CPC .......... *G01S 7/4056* (2013.01); *G01S 7/4972* (2013.01); *G01S 7/403* (2021.05); *G01S 7/4082* (2021.05); *G01S 7/4086* (2021.05); *G01S 13/931* (2013.01)

(58) Field of Classification Search
CPC ....... G01S 2007/403; G01S 2007/4086; G01B 11/2755; G01B 11/275; G01B 21/26; G01B 11/0608; G01B 5/0025; G01B 5/255; G01B 7/315
USPC .................................................. D10/65, 103
See application file for complete search history.

(56) References Cited

U.S. PATENT DOCUMENTS

| | | | | |
|---|---|---|---|---|
| 10,240,916 | B1* | 3/2019 | Golab | G01B 11/275 |
| 10,794,996 | B2* | 10/2020 | Qiu | G01S 7/4026 |
| 2013/0325252 | A1* | 12/2013 | Schommer | G01S 7/52004 |
| | | | | 701/33.1 |
| 2014/0310967 | A1* | 10/2014 | Nagornov | G01B 21/26 |
| | | | | 33/301 |
| 2015/0059458 | A1* | 3/2015 | Lee | G01M 17/013 |
| | | | | 73/115.07 |
| 2015/0134191 | A1 | 5/2015 | Kim | |
| 2019/0249985 | A1* | 8/2019 | Stieff | G01S 7/4026 |

FOREIGN PATENT DOCUMENTS

| | | |
|---|---|---|
| CN | 102844800 A | 12/2012 |
| CN | 203908423 U | 10/2014 |
| CN | 104406576 A | 3/2015 |
| CN | 205642199 U | 10/2016 |
| CN | 106218527 A | 12/2016 |
| CN | 106405526 A | 2/2017 |
| CN | 107678004 A | 2/2018 |
| CN | 107856649 A | 3/2018 |
| CN | 207557462 U | 6/2018 |
| WO | 2011/128739 A1 | 10/2011 |

OTHER PUBLICATIONS

The Extended European Search Report dated Jul. 30, 2021; Appln. No. 18868598.6.
The First Chinese Office Action dated Aug. 19, 2021; Appln. No. 202010136237.8.

* cited by examiner

CALIBRATION DEVICE OF AUTOMOBILE ASSISTANCE SYSTEM

CROSS-REFERENCE

The present application is a continuation-in-part of International Patent Application No. PCT/2018/110099 filed on Oct. 12, 2018, which claims priority to Chinese Patent Application No. 201710985445.3 filed on Oct. 20, 2017, both of which are incorporated herein by reference in their entireties.

BACKGROUND

Technical Field

The present invention relates to the technical field of automobile maintenance and device calibration, and in particular, to a calibration device of an automobile assistance system.

Related Art

In the field of automobile maintenance, especially during calibration for advanced driver assistant systems (ADAS) mounted on an automobile, a device in ADAS, such as a sensor for sensing environment like a camera or radar, needs to be calibrated. For example, a radar that is on a left rear and a right rear of the automobile and that is responsible for detecting a blind area of a driver during lane changing needs to be calibrated. Mounting positions of apparatuses in ADAS mounted on different vehicles between different automobile series or between same automobile series are different due to body widths, styling design, and mounting angles, etc., and therefore requirements for mounting distances and angles of the calibration device are different.

During implementation of the present invention, the inventor finds the following disadvantages in an existing calibration manner.

During calibration, the calibration device needs to be removed and mounted in order to achieve calibration of the ADAS device at different positions by the calibration device. This method is time-consuming and labor-consuming, and affects consistency of the calibration device.

SUMMARY

In order to resolve the foregoing technical problems, embodiments of the present invention provide a calibration device of an automobile assistance system, which is easy to use and has relatively high calibration precision.

In embodiments of the present invention, the technical problems are resolved using the following technical solutions.

A calibration device of an automobile assistance system includes a support assembly, a beam assembly, and a sliding member. The beam assembly is mounted to the support assembly and may move relative to the support assembly along a vertical direction. The sliding member is mounted to the beam assembly and may move relative to the beam assembly along a horizontal direction. A calibration apparatus is mounted to the sliding member and is used to calibrate a device in an ADAS assistance system mounted to an automobile. When the calibration apparatus is used to calibrate the device in the ADAS assistance system, a position thereof is changed through the sliding member to calibrate a same or different device in the ADAS assistance system.

Optionally, the support assembly includes a support body and a height adjusting member. At least three height adjusting members are mounted to a bottom surface of the support body, which are configured to adjust an overall horizontal angle of the support body and a pitch angle of the support body.

Optionally, there are three height adjusting members, and the three height adjusting members are distributed in an isosceles triangle. The three height adjusting members are configured to coordinately adjust the overall horizontal angle of the support body, and the height adjusting member located at a vertex position of a vertex angle of the isosceles triangle is configured to adjust the pitch angle of the support body.

Optionally, the support assembly includes a base support and an upright support. One end of the upright support is connected to the base support, the base support supporting the upright support. The beam assembly is mounted to the upright support. The base support includes a roller, the support body, and the height adjusting member. At least three rollers are mounted to a bottom surface of the support body to facilitate movement of the base support.

Optionally, the upright support includes a lifting screw rod. The lifting screw rod is disposed along a vertical direction. The beam assembly is sleeved on the lifting screw rod and is mated with the lifting screw rod through threads. When the lifting screw rod rotates around a central axis of the lifting screw rod, the lifting screw rod is configured to drive the beam assembly to move in a vertical direction along the lifting screw rod.

Optionally, the upright support includes a lifting guide rail. The lifting guide rail includes a vertical rod, the vertical rod being disposed along a vertical direction. The beam assembly is movably mounted to the vertical rod, the vertical rod being configured to guide the beam assembly to move in a vertical direction.

Optionally, the lifting guide rail includes a horizontal rod, the horizontal rod being mounted to the vertical rod along a horizontal direction. One end of the lifting screw rod is mounted to the horizontal rod, and the other end of the lifting screw rod is mounted to the support body.

Optionally, the lifting guide rail includes a horizontal rod and a bottom rod. The two vertical rods are disposed in parallel to each other and spaced apart along a vertical direction. The horizontal rod is disposed along a horizontal direction, both ends thereof being respectively mounted to the two vertical rods. The bottom rod is fixedly mounted to the support body, and one end that is of each of the vertical rods and that is far away from the horizontal rod is fixedly mounted to the bottom rod. One end of the lifting screw rod is fixedly mounted to the horizontal rod, and the other end of the lifting screw rod is fixedly mounted to the bottom rod.

Optionally, the upright support includes a height gauge. The height gauge is mounted to the vertical rod along a vertical direction, and is configured to measure a distance by which the beam assembly moves along a vertical direction.

Optionally, the beam assembly includes a supporting member and a guide rail. The supporting member includes a supporting body and a movable block. The movable block is fixedly mounted to the supporting body and sleeved on the lifting screw rod, the movable block being mated with the lifting screw rod through threads. The guide rail is fixedly mounted to the supporting body along a horizontal direction.

The sliding member is movably mounted to the guide rail and may move in a horizontal direction along the guide rail.

Optionally, the upright support includes a vertical rod, the vertical rod being disposed along a vertical direction. The supporting member includes a sliding block. The sliding block is fixedly mounted to the supporting body, and the sliding block is movably mounted to the vertical rod and may slide along the vertical rod.

Optionally, two clamping portions respectively extend from two opposite sides of the supporting body. The two clamping portions are elongated strip-shaped and are disposed in parallel to each other and spaced apart along a horizontal direction. The two guide rails are correspondingly mounted to the two clamping portions, respectively, and are spaced apart by a preset distance and disposed in parallel to each other along a horizontal direction. The sliding member is movably mounted to the guide rail through a sliding bearing.

Optionally, the beam assembly includes a horizontal gradienter, the horizontal gradienter being configured to detect whether the guide rail is horizontally disposed.

Optionally, on each of both sides of the guide rail, there is a horizontal scale that uses a center of the guide rail as a zero point. The horizontal scales respectively extend along both sides of the guide rail, to facilitate positioning of a location of the sliding member.

Optionally, the calibration apparatus (40) includes any one of the following: a Doppler signal simulator, a calibration target, a reflecting mirror, and a night vision signal simulator, etc.

In the calibration device of the automobile assistance system according to the embodiments of the present invention, the beam assembly may move relative to the support assembly along a vertical direction, and the sliding member may move relative to the beam assembly along a horizontal direction, to cause the calibration apparatus to be mounted on the sliding member that may slide from left to right, so that the calibration apparatus may slide continuously from left to right, so that the same or different apparatus in ADAS may be conveniently and rapidly calibrated, making calibration convenient and more accurate.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present therebetween. An element described as being "connected" or "attached" to another element may be directly connected or attached to the other element, or one or more intervening components may be present therebetween. When an element is directly "connected" or "attached" to another element, the element can be connected to another element by a fastener (such as a screw) or by molding. In the case of molding, the two elements are molded into one piece. Similarly, an element described as being "mount" to another element may be directly mounted to the other element, or one or more intervening components may be present. An element can be mounted to another element by a fastener (such as a screw) or by molding or welding. The terms "vertical", "horizontal", "left", "right", "inside", "outside", and similar expressions, such as "first" and "second", as used in this specification, are for the purpose of description only.

Unless otherwise defined, all technical and scientific terms used herein have the same meaning as commonly understood by one of ordinary skill in the art to which the present invention belongs. In this specification, terms used in the specification of the present invention are merely intended to describe objectives of the specific embodiments, but are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
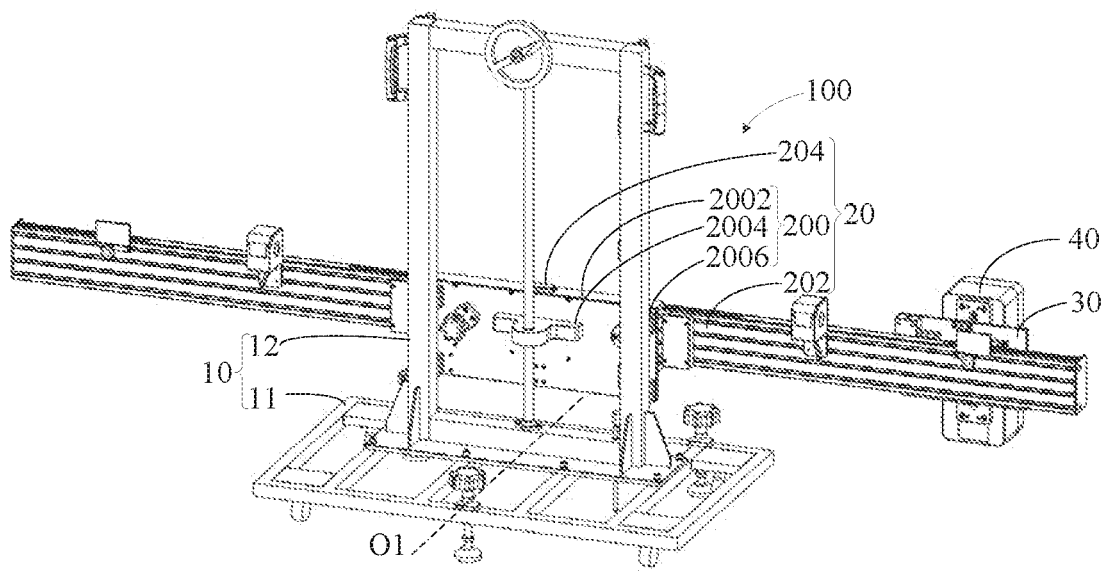
FIG. 1 is a three-dimensional view of a calibration device of an automobile assistance system according to an embodiment of the present invention.

Referring to FIG. 1, a calibration device 100 of an automobile assistance system according to an embodiment of the present invention includes a support assembly 10, a beam assembly 20, a sliding member 30, and a calibration apparatus 40. The beam assembly 20 is mounted to the support assembly 10 and may move relative to the support assembly 10 along a vertical direction. The sliding member 30 is mounted to the beam assembly 20 and may move relative to the beam assembly 20 along a horizontal direction. The calibration apparatus 40 is mounted to the sliding member 30 and may move together with the sliding member 30 relative to the beam assembly 20 along a horizontal direction. The calibration apparatus 40 may include apparatuses such as a Doppler signal simulator, a calibration target, a reflecting mirror, and a night vision signal simulator. Different calibration apparatuses may be used to calibrate different apparatuses in ADAS. For example, the Doppler signal simulator is used to simulate signals generated by a rear vehicle, and then used to calibrate a blind-area radar mounted to a left rear and a right rear of the vehicle, where the blind-area radar is applied to a blind spot detection system in ADAS. The calibration target is used to calibrate a camera mounted to the vehicle, such as a camera used to calibrate a lane keeping system. The reflecting mirror may be used to calibrate a distance sensor in an adaptive cruise system. The night vision signal simulator may be used to send out a thermal signal to calibrate a sensor in the night vision system. Through application of the calibration device 100 of the automobile assistance system in the embodiment of the present application, a calibration position may be flexibly adjusted to achieve a calibration effect when the calibration apparatus is used to calibrate a sensor in the ADAS. Alternatively, the calibration apparatus may be used to calibrate a plurality of sensors in the ADAS, such as calibration of the blind-area radar located at a left rear and a right rear of the vehicle, so that consistency of the calibration may be ensured, improving accuracy of the calibration.

The support assembly 10 includes a base support 11 and an upright support 12. One end of the upright support 12 is connected to the base support 11, and the base support 11 supports the upright support 12.

Figure 2:
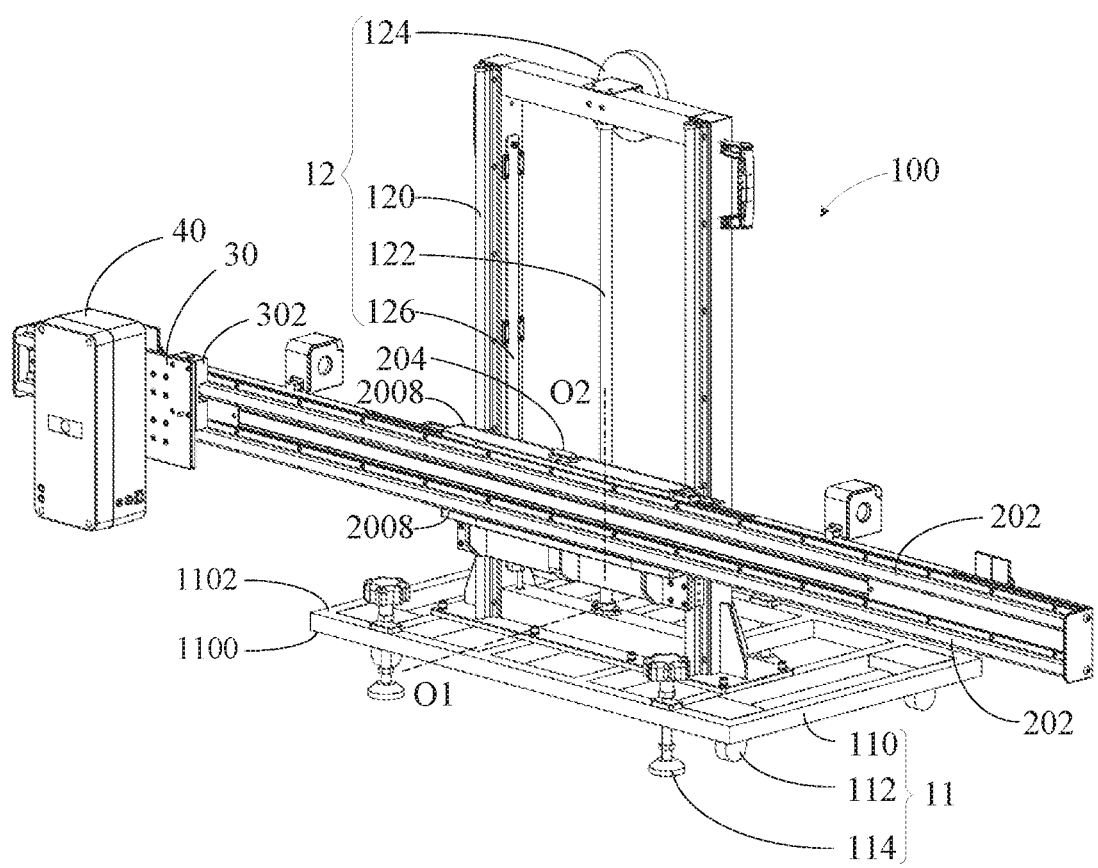
FIG. 2 is a three-dimensional view of the calibration device of the automobile assistance system shown in FIG. 1 from another perspective.
Figure 3:
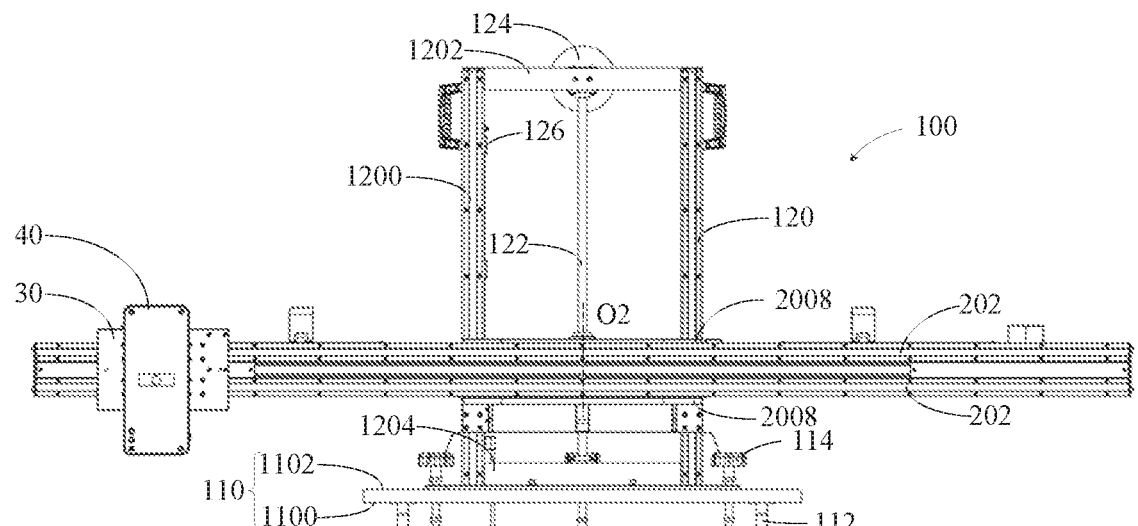
FIG. 3 is a front view of the calibration device of the automobile assistance system shown in FIG. 2.

Referring to both FIG. 2 and FIG. 3, the base support 11 includes a support body 110, a roller 112, and a height adjusting member 114. The support body 110 is a rectangular plate and may be made of a metal material. In order to reduce a weight, a plurality of hollow-out areas is formed. The support body 110 includes a bottom surface 1100 and an upper surface 1102 that are oppositely disposed. The support body 110 has a central axis O1.

The roller 112 is mounted to the bottom surface 1100 for facilitating movement of the base support 11. In an embodiment, the roller 112 is an omni-directional moving roller, so that the base support 11 can move toward any direction. There are four rollers 112, which are respectively mounted to four corners of the support body 110. It may be understood that, in some other embodiments, a shape of the support body 110 may vary according to an actual demand, and is not limited to a rectangle. For example, the support body 110 may be a circle. The number of rollers 112 may be increased or decreased according to an actual demand, as long as it can be ensured that there are at least three rollers.

The height adjusting member 114 is mounted to the bottom surface 1100 for adjusting a height of the support body 110. In an embodiment, the height adjusting member 114 is an adjusting hand wheel, and there are three adjusting hand wheels. For example, as shown in FIG. 2, the height adjusting member 114 includes an adjustment screw. The three adjusting hand wheels 114 are distributed in an isosceles triangle. Two adjusting hand wheels 114 located at a bottom edge of the isosceles triangle are disposed on one side of the support body 110, and are symmetrically disposed along the central axis O1 of the support body 110. The other adjusting hand wheel 114 is disposed on the other side of the support body 110, and is disposed on the central axis O1 of the support body 110 (that is, disposed at a vertex position of a vertex angle of the isosceles triangle). The three adjusting hand wheels 114 may be mated to adjust an overall horizontal angle of the support body 110. The adjusting hand wheel 114 located on the central axis O1 of the support body 110 is adjusted independently, so that a pitch angle of the support body 110 can be adjusted.

It may be understood that the height adjusting member 114 may be other apparatuses that may adjust a height. The number of height adjusting members 114 may be increased or decreased according to an actual demand as long as there are at least three height adjusting members 114.

The upright support 12 includes a lifting guide rail 120, a lifting screw rod 122, and a height gauge 126. In an embodiment, the upright support 12 may further includes a lifting crank handle 124.

The lifting guide rail 120 is mounted to the support body 110. The lifting guide rail 120 includes a vertical rod 1200, a horizontal rod 1202, and a bottom rod 1204. The two vertical rods 1200 are disposed in parallel along a vertical direction and spaced apart from each other. The two vertical rods 1200 are configured to guide the beam assembly 20 to move along a vertical direction. In the embodiment, the two vertical rods are two vertical guide rails configured to guide the beam assembly 20 to move along a vertical direction. The vertical rod can be a single rod that is used as a guide rail. Alternatively, the vertical rod is a component including a guide rail or a rod.

The horizontal rod 1202 is disposed along a horizontal direction, both ends thereof being respectively mounted to the two vertical rods 1200. The bottom rod 1204 is fixedly mounted to the support body 110. One end that is of each of the vertical rods 1200 and that is far away from the horizontal rod 1202 is fixedly mounted to the bottom rod 1204.

It should be noted that the shape of the horizontal rod 1202 and the bottom rod 1204 is not limited in the application. For example, the horizontal rod 1202 may be rod-shaped or plate-shaped. Similarly, the bottom rod 1204 may be rod-shaped or plate-shaped.

It may be understood that, in some other embodiments, the number of vertical rods 1200 may be increased or decreased according to an actual demand. For example, there may be one or three vertical rods 1200.

The lifting screw rod 122 is mounted to the lifting guide rail 120 along a vertical direction. The lifting screw rod 122 is configured to rotate relative to the lifting guide rail 120. One end of the lifting screw rod 122 is mounted to the horizontal rod 1202, and the other end of the lifting screw rod 122 is mounted to the bottom rod 1204. In an embodiment, the lifting screw rod 112 is rotatably mounted to the lifting guide rail 120. For example, the lifting screw rod 112 can be mounted to the lifting guide rail 120 through a bearing. In some other embodiments, a first part of the lifting screw rod 112 is fixedly mounted to the lifting guide rail 120, and a second part of the lifting screw rod 112 is rotatable relative to the first part of the lifting screw rod 112. The second part of the lifting screw rod 112 is attached to a supporting member 200 and is rotatably attached to the first part of the lifting screw rod 112.

It may be understood that, in some other embodiments, the bottom rod 1204 may be omitted. One end that is of each of the vertical rods 1200 and that is far away from the horizontal rod 1202 is fixedly mounted to the support body 110. The lifting screw rod 122 is mounted to the lifting guide rail 120 along a vertical direction. One end of the lifting screw rod 122 is mounted to the horizontal rod 1202, and the other end of the lifting screw rod 122 is mounted to the support body 110.

The lifting crank handle 124 is mounted to the horizontal rod 1202, and is connected to the lifting screw rod 122. When the lifting crank handle 124 rotates, the lifting screw rod 122 is driven to rotate around a central axis of the lifting screw rod 122. In an embodiment, a connecting rod of the lifting crank handle 124 is perpendicular to the lifting screw rod 122, and is connected to the lifting screw rod 122 through a gear structure. It may be understood that, in some other embodiments, the connecting rod of the lifting crank handle 124 may be coaxial with the lifting screw rod 122, and the connecting rod of the lifting crank handle 124 is directly connected to the lifting screw rod 122. The lifting crank handle 124 is configured to manually rotate the lifting screw rod 122. Alternatively, the lifting crank handle 124 may be replaced with other apparatuses such as a motor for driving the lifting screw rod 122 to rotate. In an embodiment, a power adaptor is provided, and the motor is a direct current (DC) motor. One end of the power adaptor is connected to a DC port of the motor, and the other end of the power adaptor is connected to an alternating current (AC) port. In some embodiments, the motor is an AC motor. With the help of the motor, the lifting screw rod 122 can be rotated automatically. In some other embodiments, the calibration device can include both a lifting crank handle 124 and a motor.

The height gauge 126 is mounted to the vertical rod 1200 along a vertical direction. The height gauge 126 has scales, which are configured to measure a distance by which the beam assembly 20 moves along a vertical direction.

In an embodiment, the upright support 12 further includes a handle. For example, as shown in FIG. 1, the upright support 12 includes a pair of handles. The number of handle is not limited in the application. In an embodiment, there is only one handle. In some other embodiments, there are three or four handles.

Referring to both FIG. 1 and FIG. 2, the beam assembly 20 includes a supporting member 200, a guide rail 202, and a gradienter 204. The supporting member 200 is mounted to the lifting guide rail 120. Under guidance of the lifting guide rail 120, the supporting member 200 may move relative to the lifting guide rail 120 along a vertical direction. The guide rail 202 is fixedly mounted to the supporting member 200 and may move together with the supporting member 200 relative to the lifting guide rail 120 along a vertical direction. In an embodiment, the guide rail 202 may be formed by grooving a crossbeam of the beam assembly 20. In some other embodiments, the guide rail 202 is a separate component and is mounted to the crossbeam of the beam assembly 20. A sliding member 30 is mounted to the guide rail 202 and may move relative to the guide rail 202 along a horizontal direction.

The supporting member 200 includes a supporting body 2002, a movable block 2004, and a sliding block 2006.

The supporting body 2002 is substantially plate-shaped. Two clamping portions 2008 respectively extend from two opposite sides of the supporting body. The two clamping portions 2008 are elongated strip-shaped and are disposed in parallel to each other and spaced apart along a horizontal direction. In some embodiments, only one elongated strip-shaped clamping portion 2008 is provided. The one clamping portion extends from a lower side of the supporting body 2002 or is mounted to a lower side of the supporting body 2002. The clamping portion(s) is/are provided so that the guide rail 202 can be mounted easily.

The movable block 2004 is fixedly mounted to the supporting body 2002 and is sleeved on the lifting screw rod 122. The movable block 2004 is mated with the lifting screw rod 122 through threads. When the lifting screw rod 122 rotates around the central axis thereof, the movable block 2004 may be driven to move in a vertical direction along the lifting screw rod 122, thereby driving the beam assembly 20 to move along a vertical direction. The movable block 2004 and the clamping portion 2008 are respectively located on two opposite sides of the supporting body 2002. That is, the guide rail 202 and the movable block 2004 are located on two opposite sides of the supporting body 2002.

The sliding block 2006 is fixedly mounted to the supporting body 2002, and is located on a same side of the supporting body 2002 as the movable block 2004. At least one sliding block 2006 is correspondingly mounted to each of the vertical rods 1200. Each of the sliding blocks 2006 is movably mounted to a vertical rod 1200 corresponding to the sliding block 2006, and may slide along the vertical rod 1200 corresponding to the sliding block 2006. In an embodiment, two of the sliding blocks 2006 are correspondingly mounted to each of the vertical rods 1200. It may be understood that, in some other embodiments, the number of sliding blocks 2006 correspondingly mounted to each of the vertical rods 1200 may be increased or decreased according to an actual demand. For example, the number of the sliding blocks may be decreased to one or increased to three.

As shown in FIG. 1, the movable block 2004 is mounted on a middle part of the supporting body 2002. The sliding blocks 2006 are located on both ends of the supporting body 2002. The movable block 2004 is located between the sliding block(s) mounted to one of the two vertical rods 1200 and the sliding block(s) mounted to another of the two vertical rods 1200.

The two guide rails 202 are correspondingly mounted to the two clamping portions 2008 respectively, and are spaced apart by a preset distance and disposed in parallel to each other along a horizontal direction. On each of both sides of the guide rail 202, there is a horizontal scale that uses a center of the guide rail as a zero point. The horizontal scales extend toward both sides respectively, so as to facilitate positioning of a location of the sliding member 30. As shown in FIG. 3, there are two sides on the guide rail 202, left side and a right side. The two sides are on a same plane. In an embodiment, the left side and the right side take the center of the guide rail 202 as a boundary. One horizontal scale is disposed on the left side of the guide rail 202, and another horizontal scale is disposed on the right side of the guide rail 202. In an embodiment, the horizontal scale disposed on the left side is a mirror of the horizontal scale disposed on the right side. In some embodiments, the two horizontal scales can be respectively disposed on two ends of the guide rails.

In an embodiment, the horizontal scale disposed on the left side is spaced apart from the horizontal scale disposed on the right side. In some other embodiments, there is no space between the horizontal scale disposed on the left side and the horizontal scale disposed on the right side. The horizontal scale disposed on the left side is connected to the horizontal scale disposed on the right side.

A central axis O2 of the guide rail 202 and the central axis O1 of the support body 110 are on a same plane. It may be understood that, in some other embodiments, the number of the guide rails 202 may be increased or decreased according to an actual demand, for example, decreased to one or increased to three. The guide rail 202 may also be fixedly mounted to the supporting member 200 in any other appropriate manner. For example, the clamping portion 2008 is omitted, and the guide rail 202 is directly welded to the supporting body 2002.

The gradienter 204 is mounted to an upper side of the clamping portion 2008 for detecting whether the clamping portion 2008 is horizontally disposed, thereby determining whether the guide rail 202 is horizontally disposed. It may be understood that, in some other embodiments, the gradienter 204 may also be mounted to the guide rail 202 or mounted to other portions of the beam assembly 20, such as a calibration pattern, as long as the gradienter can be configured to detect whether the guide rail 202 is horizontally disposed.

The sliding member 30 is movably mounted to the guide rail 202 and may move in a horizontal direction along the guide rail 202. In an embodiment, the sliding member 30 is movably mounted to the guide rail 202 through a sliding bearing 302. The sliding member 30 includes several mount points for mounting the calibration apparatus 40. It may be understood that, in some other embodiments, the sliding member 30 may be movably mounted to the guide rail 202 in other appropriate manners. For example, the sliding bearing 302 is omitted, and the sliding member 30 is directly mounted to the guide rail 202.

The calibration apparatus 40 is mounted to a mounting point and is used to calibrate a sensor in the ADAS system.

For example, the calibration apparatus 40 may be a Doppler signal simulator 40 that specifically simulates other automobiles on the left rear or right rear of the to-be-calibrated automobile, further implementing calibration.

A method for calibrating a vehicle through application of the calibration device 100 of the automobile assistance system according to the embodiment of the present application is described below with a calibration apparatus as a Doppler signal simulator.

Figure 4:
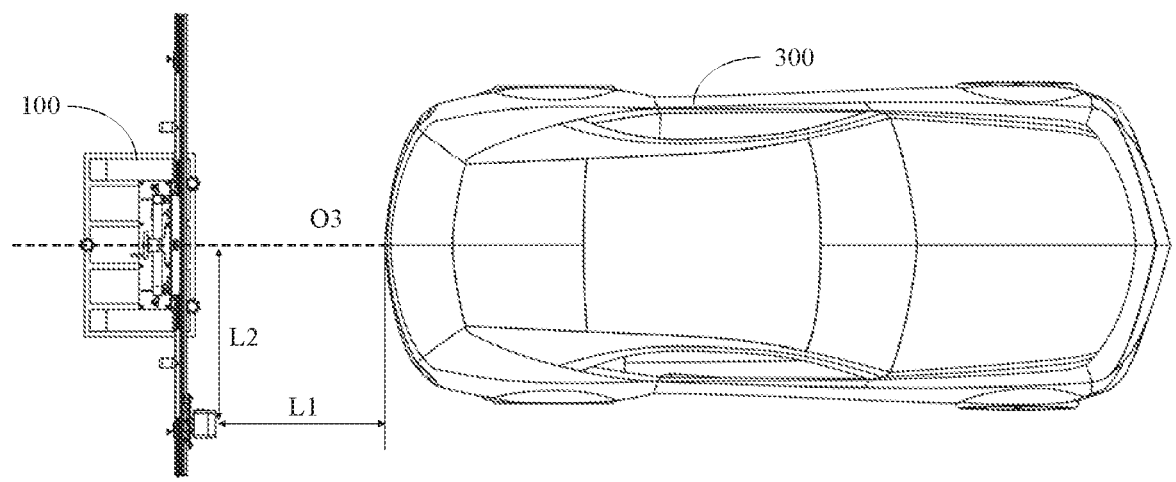
FIG. 4 is a schematic diagram of calibrating a radar for a blind area of an automobile by the calibration device of the automobile assistance system shown in FIG. 1.

Referring to FIG. 4, before calibration, the calibration device 100 of the automobile assistance system is moved to a rear of a to-be-calibrated automobile 300. Based on a distance required to calibrate different automobile models, a distance between the Doppler signal simulator 40 and the automobile 300 is L1. A central axis O2 of the guide rail 202 is aligned with a central axis O3 of the to-be-calibrated automobile, that is, the central axis O2 and the central axis O3 are on a same plane. The three height adjusting members 114 are unscrewed to cause the rollers 112 to be separated from the ground, so that the support assembly 10 can be stably fixed to the rear of the to-be-calibrated automobile 300, while the support body 110 is levelled through the gradienter 204 to cause the guide rail 202 to be horizontally disposed.

The sliding member 30 equipped with the Doppler signal simulator 40 is moved along the guide rail 202, so that the Doppler signal simulator 40 moves to one side of the guide rail 202, and a distance between the Doppler signal simulator 40 and the central axis O3 of the to-be-calibrated automobile 300 is L2. Afterwards, a height of the guide rail 202 is adjusted through the lifting crank handle 124 and the lifting guide rail 120, so that the Doppler signal simulator 40 reaches a height required for calibration. As a result, adjustment of the position of the calibration device 100 of the automobile assistance system is completed.

When calibration of the radar for the blind area is performed, according to a real-time value read by a calibration instrument, the adjustment hand wheel 114 located on the central axis O1 of the support body 110 may be adjusted to perform fine adjustment on the pitch angle of the calibration device 100 of the automobile assistance system, to compensate for an angle error between a horizontal plane on which the automobile 300 is located and a horizontal plane on which the calibration device 100 of the automobile assistance system, so that the calibration instrument acquires an optimal calibration value and completes calibration of a radar for a blind area on a side of the to-be-calibrated automobile 300.

The Doppler signal simulator 40 is moved to the other side of the guide rail 202, and a distance between the Doppler signal simulator 40 and the central axis O3 of the to-be-calibrated automobile 300 is L2, and therefore adjustment of a position of the calibration device 100 of the to-be-calibrated automobile assistance system is completed. The calibration instrument is used to read the value, and calibration performed on the radar for the blind area on the other side of the automobile 300 is completed.

Through the calibration device 100 of the automobile assistance system of the embodiments of the present invention, the central axis O3 of the automobile 300 is used as the reference axis, and an uncontrollable error caused by using the horizontal plane as the reference plane can be avoided. In this case, the Doppler signal simulator 40 is mounted to the sliding member 30 that may slide from left to right, so that the Doppler signal simulator 40 can slide continuously from left to right, the radar for the blind areas at a left rear and a right rear of the automobile 300 are conveniently and rapidly calibrated, and consistency of parameters such as the height and the angle of the calibration device 100 of the automobile assistance system is ensured, achieving a more accurate calibration operation.

In addition, the angle error between the horizontal plane on which the automobile 300 is located and the horizontal plane on which the calibration device 100 of the automobile assistance system may be adjusted through the height adjusting member 114, so that the calibration precision is more accurate.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A calibration device, comprising:
   a base support;
   an upright support mounted on the base support, the upright support comprising:
   a lifting guide rail comprising two vertical guide rails, the two vertical guide rails being disposed in parallel in a vertical direction and spaced apart from each other; and
   a lifting screw rod disposed in the vertical direction;
   a motor configured to drive the lifting screw rod to rotate;
   a beam assembly mounted to the lifting guide rail and configured to move relative to the lifting guide rail along the vertical direction, the beam assembly comprising:
   a supporting member, the supporting member comprising:
   a supporting body;
   a movable block fixedly attached to the supporting body, wherein the movable block is mated with the lifting screw rod through threads, the lifting screw rod being configured to drive the movable block to move in the vertical direction when the lifting screw rod rotates;
   a first sliding block fixedly attached to the supporting body and movably mounted to a first vertical guide rail of the two vertical guide rails, the first sliding block being configured to slide along the first vertical guide rail; and
   a second sliding block fixedly attached to the supporting body and movably mounted to a second vertical guide rail of the two vertical guide rails, the second sliding block being configured to slide along the second vertical guide rail; and
   a horizontal guide rail configured to be mounted to the supporting body along a horizontal direction; and
   a horizontal scale disposed on each of two sides of the horizontal guide rail.

2. The calibration device according to claim 1, wherein the movable block, the first sliding block and the second sliding block are disposed on a same side of the supporting body; and
wherein the movable block and the horizontal guide rail are respectively disposed on two opposite sides of the supporting body.

3. The calibration device according to claim 1, wherein the upright support further comprises a crank handle configured to manually rotate the lifting screw rod.

4. The calibration device according to claim 1, wherein the upright support further comprises a height gauge configured to measure a distance by which the beam assembly moves along the vertical direction.

5. The calibration device according to claim 1, wherein the lifting guide rail comprises a horizontal rod disposed in the horizontal direction, one end of the horizontal rod being attached to the first vertical guide rail and another end of the horizontal rod being attached to the second vertical guide rail.

6. The calibration device according to claim 5, wherein one end of the lifting screw rod is mounted to the horizontal rod.

7. The calibration device according to claim 5, wherein the upright support further comprises a crank handle configured to manually rotate the lifting screw rod, the crank handle being mounted to the horizontal rod.

8. The calibration device according to claim 1, wherein the upright support comprises a handle.

9. The calibration device according to claim 1, wherein each of the first sliding block and the second sliding block comprises two sliding blocks.

10. The calibration device according to claim 1, wherein the movable block is disposed on a middle part of the supporting body;
the first sliding block and the second sliding block being respectively disposed on both ends of the supporting body.

11. The calibration device according to claim 1, wherein the supporting body is plate-shaped;
wherein the supporting member comprises a clamping portion attached to the supporting body, the clamping portion being elongated strip-shaped.

12. The calibration device according to claim 1, further comprising:
a gradienter configured to detect whether the horizontal guide rail is horizontally disposed.

13. The calibration device according to claim 1, further comprising:
a sliding member movable mounted to the horizontal guide rail, wherein the sliding member is configured to move in the horizontal direction along the horizontal guide rail.

14. A calibration device, comprising:
a base support;
an upright support mounted on the base support;
a beam assembly mounted to the upright support and configured to move relative to the upright support along a vertical direction, wherein the beam assembly comprises a horizontal guide rail; and
a horizontal scale disposed on each of two sides of the horizontal guide rail;
wherein the upright support comprises a lifting screw rod disposed in the vertical direction, the lifting screw rod being configured to drive the beam assembly to move along the vertical direction;
wherein the upright support comprises a lifting guide rail disposed in the vertical direction, and the lifting guide rail comprises two vertical guide rails, the two vertical guide rails being disposed in parallel in the vertical direction and spaced apart from each other;
wherein the lifting guide rail comprises a horizontal rod disposed in the horizontal direction, both ends of the horizontal rod being respectively attached to the two vertical guide rails;
wherein one end of the lifting screw rod is mounted to the horizontal rod; and
wherein the lifting guide rail comprises a bottom, rod, an end that is of each of the two vertical guide rails and that s far away from the horizontal rod being fixedly attached to the bottom rod, the other end of the lifting screw rod being mounted to the bottom rod.

15. The calibration device according to claim 14, further comprising a motor configured to drive the lifting screw rod to rotate.

16. The calibration device according to claim 14, wherein the upright support further comprises a crank handle configured to manually rotate the lifting screw rod.

17. The calibration device according to claim 14, wherein the beam assembly comprises a supporting member, the supporting member comprising:
a supporting body;
a movable block fixedly attached to a first side of the supporting body, wherein the movable block is mated with the lifting screw rod through threads, the lifting screw rod being configured to drive the movable block to move in the vertical direction when the lifting screw rod rotates;
a first sliding block fixedly attached to the first side of the supporting body and movably mounted to a first vertical guide rail of the two vertical guide rails, the first sliding block being configured to slide along the first vertical guide rail; and
a second sliding block fixedly attached to the first side of the supporting body and movably mounted to a second vertical guide rail of the two vertical guide rails, the second sliding block being configured to slide along the second vertical guide rail;
wherein the horizontal guide rail is configured to be mounted to a second side of the supporting body along the horizontal direction.

18. The calibration device according to claim 17, wherein each of the first sliding block and the second sliding block comprises two sliding blocks.

19. The calibration device according to claim 17, wherein the movable block is disposed on a middle part of the supporting body;
the first sliding block and the second sliding block being respectively disposed on both ends of the supporting body.

20. The calibration device according to claim 17, wherein the supporting body is plate-shaped;
wherein the supporting member comprises a clamping portion attached to the supporting body, the clamping portion being elongated strip-shaped.

21. The calibration device according to claim 17, wherein the second side of the supporting body is opposite the first side of the supporting body.

22. The calibration device according to claim 14, wherein the upright support further comprises a crank handle configured to manually rotate the lifting screw rod, the crank handle being mounted to the horizontal rod.

23. The calibration device according to claim 14, wherein the upright support further comprises a height gauge configured to measure a distance by which the beam assembly moves along the vertical direction.

24. The calibration device according to claim 14, wherein the upright support comprises a handle.

25. The calibration device according to claim 14, further comprising:
   a gradienter configured to detect whether the horizontal guide rail is horizontally disposed.

* * * * *